United States Patent [19]
Keller

[11] 3,714,553
[45] Jan. 30, 1973

[54] FINELY STABILIZING THE MAGNETIC FIELD OF A MAGNETIC NUCLEAR RESONANCE DEVICE
[75] Inventor: Toni Keller, Fallanden, Switzerland
[73] Assignee: Spectrospin AG, Fallanden, Switzerland
[22] Filed: March 10, 1971
[21] Appl. No.: 122,960

[30] Foreign Application Priority Data
March 12, 1970 Switzerland..........................3698/70

[52] U.S. Cl. .............................................324/0.5 R
[51] Int. Cl. .............................................G01n 27/78
[58] Field of Search.........324/0.5 R, 0.5 A, 0.5 AC, 0.5 AH, 324/0.5 MA

[56] References Cited
FOREIGN PATENTS OR APPLICATIONS
153,133   4/1963   U.S.S.R...........................324/0.5 MA Primary Examiner—Michael J. Lynch

[57] ABSTRACT

In a magnetic nuclear resonance spectrum analyzer including a pair of pole pieces for producing a magnetic field and coils disposed around the pole pieces and supplied with current from a device which effects a coarse stabilization of the magnetic field between the pole pieces, a pair of broadband coils having no iron in their cores disposed in the air gap between the pole pieces iron in their cores disposed in the air gap between the pole pieces and connected to receive a high frequency component of the output of a nuclear resonance stabilizer for effecting a fine stabilization of the magnetic field.

15 Claims, 8 Drawing Figures

INVENTOR.
Toni Keller

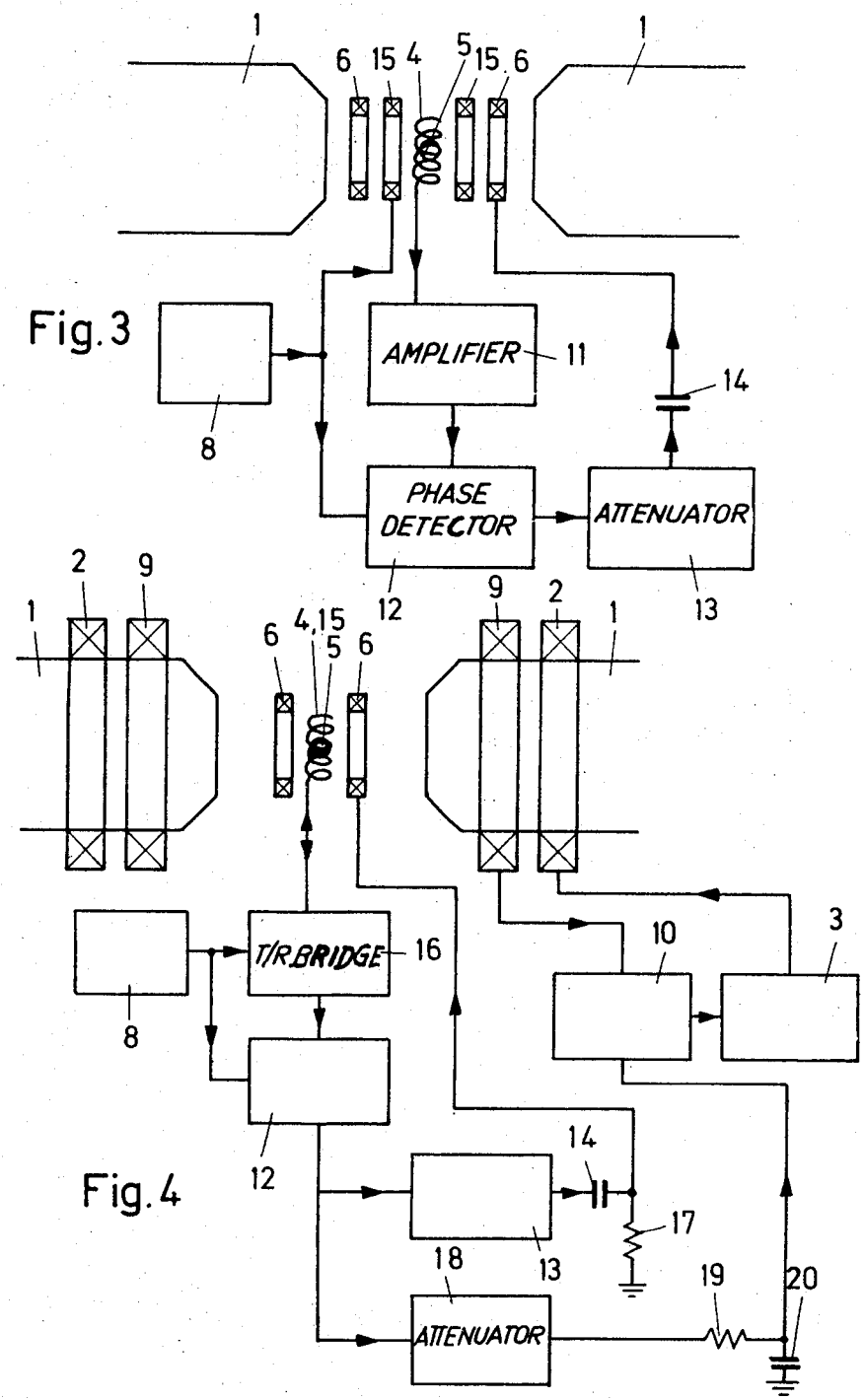

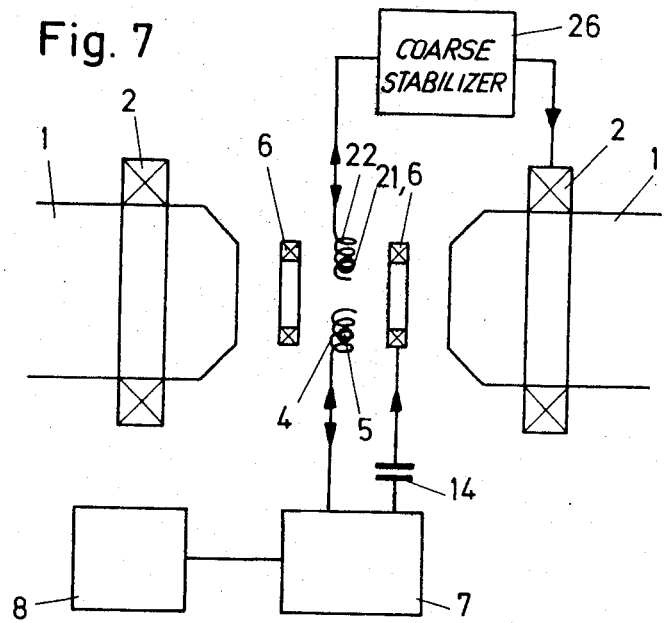
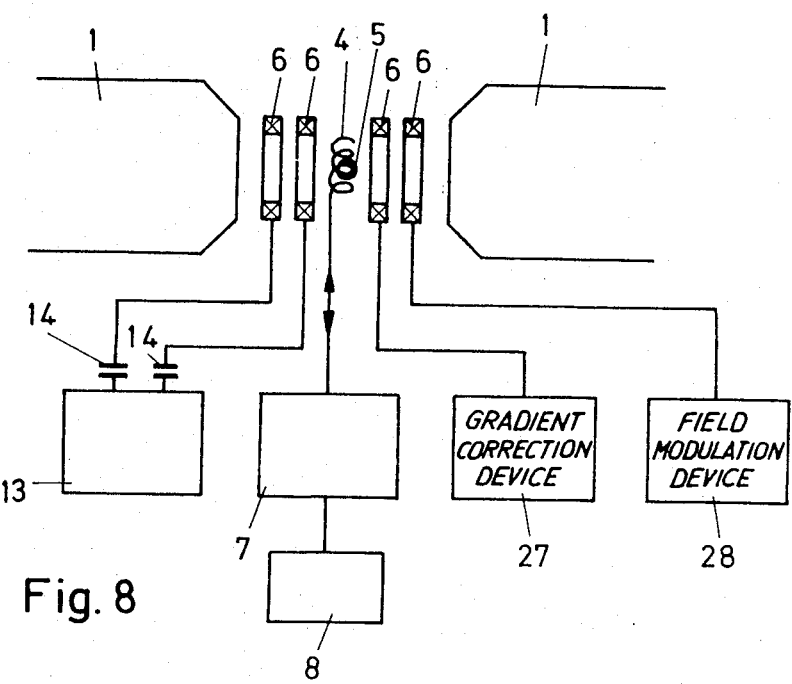

FINELY STABILIZING THE MAGNETIC FIELD OF A MAGNETIC NUCLEAR RESONANCE DEVICE

BACKGROUND OF THE INVENTION

The present invention relates to the stabilization of a magnetic nuclear resonance spectrometer, or spectrograph, and particularly to a fine stabilization which serves to eliminate rapid fluctuations in the spectrometer magnetic field. Such stabilization is accomplished by a nuclear resonance stabilizer which acts, via a capacitor, on iron-free, broadbanded, substantially gradient-free coils disposed between the pole pieces of the magnet producing the magnetic field.

Devices for recording magnetic nuclear resonance spectra utilizing a magnetic field stabilized by a nuclear resonance stabilizer are known in the art. In such devices an error signal is derived from the deviation of the resonant frequency from a standard frequency, which error signal corrects the deviations in the magnetic field intensity through one or a plurality of correction coils. An example for such a device is disclosed in Swiss Pat. No. 376,291 where a nuclear magnetic resonance stabilizer is combined with a field flux stabilizer. Other known devices combine nuclear resonance stabilizers with stabilizers for the current producing the magnetic field or with field flux and current stabilizers.

Usually the correction coils for the compensation of the magnetic field deviations are disposed on the pole pieces of the magnets producing the magnetic field so that these coils in effect contain an iron core. The reason for this can be explained on the basis of the fact that, with respect to the resolution capability of a nuclear resonance spectrometer, the field homogeneity at the location of the sample probe, i.e., between the magnetic poles, plays a decisive part and that each field correction produces certain field gradients within the pole pieces which unfavorably influence the resolution. On the other hand, the frequency response of coils having iron cores is such as to not permit rapid fine stabilization of the magnetic field.

The frequency response of a stabilizer with coils around the pole pieces is disclosed, for example, in FIG. 5 of Swiss Pat. No. 348,561. That patent discloses a permanent magnet having relatively small pole pieces which contain little iron. With the electromagnets presently in use, the frequency response thereof is much more unfavorable and exhibits a much steeper drop at higher frequencies. Temporary brief interruptions, such as often occur in the supply voltage or as are produced by adjacent electrical instruments, cannot be corrected by such stabilizers, or can be corrected only to an unsatisfactory degree.

Satisfactory correction would be possible only with iron-free, broadbanded coils. Iron-free coils between the pole pieces are employed in known nuclear resonance devices, for example as transmitting coils, field modulation coils, or field correction coils. These coils are not suited for the stabilization of the magnetic field because they produce field gradients, particularly under heavier loads such as used to correct undesired gradients in the magnetic field.

SUMMARY OF THE INVENTION

It is a primary object of the present invention to overcome the above drawbacks and difficulties.

Another object of the invention is to improve the magnetic field stabilization of nuclear resonance spectrometers.

The present invention eliminates the unsatisfactory stabilization of prior stabilizers in that, in addition to the previously employed stabilization coils above the magnetic pole pieces, additional stabilization coils are employed between the pole pieces, the latter needing to be loaded only weakly by a nuclear resonance stabilizer and only via one capacitor since the main stabilization is accomplished by the coils above the pole pieces.

The method for finely stabilizing the magnetic field strength of a magnetic nuclear resonance spectrometer thus consists in that the main stabilization is effected by means of coils which are disposed above the pole pieces of the magnet and that an additional rapid fine stabilization is effected by means of iron-free cores which are disposed between the pole pieces and which are connected capacitively with a magnetic resonance stabilizer. The capacitive coupling of the fine stabilization coils to the nuclear resonance stabilizer prevents a direct current flow through these coils which would interfere with the homogeneity of the field at the location of the sample probe. The advantage of this method is thus that it permits rapid fine stabilization which does not hamper the resolution of the nuclear resonance spectrograph, a feat which was not possible with the previously known methods.

Advantageously, pairs of coils are used which produce a substantially gradient-free field under small load. This condition can be met, for example, with a pair of coils which have large dimensions compared to the sample probe diameter. Better freedom from gradients is obtained by a combination of two or more pairs of coils. Information about the construction of such coil combinations which do not produce any gradients below the fourth order may be found, for example, in Swiss Pat. No. 348,560. The decisive feature in any case is the capacitive coupling to prevent any flow of direct current.

The device for performing the method of the present invention comprises a nuclear resonance spectrometer with a magnet above whose pole pieces one or a plurality of pairs of coils are disposed and are connected to a magnetic field stabilizer and wherein one or a plurality of further iron-free pairs of coils are disposed between the pole pieces of the above-mentioned magnet, the further pairs of coils being connected with a nuclear resonance stabilizer via a capacitor. The above-mentioned magnetic field stabilizer may be a current stabilizer, a magnetic flux stabilizer or a nuclear resonance stabilizer of any desired combination thereof.

BRIEF DESCRIPTION OF THE DRAWINGS

FIGS. 2 – 8 are views similar to that of FIG. 1 of further embodiments of the invention.

DESCRIPTION OF THE PREFERRED EMBODIMENTS

Figure 1:
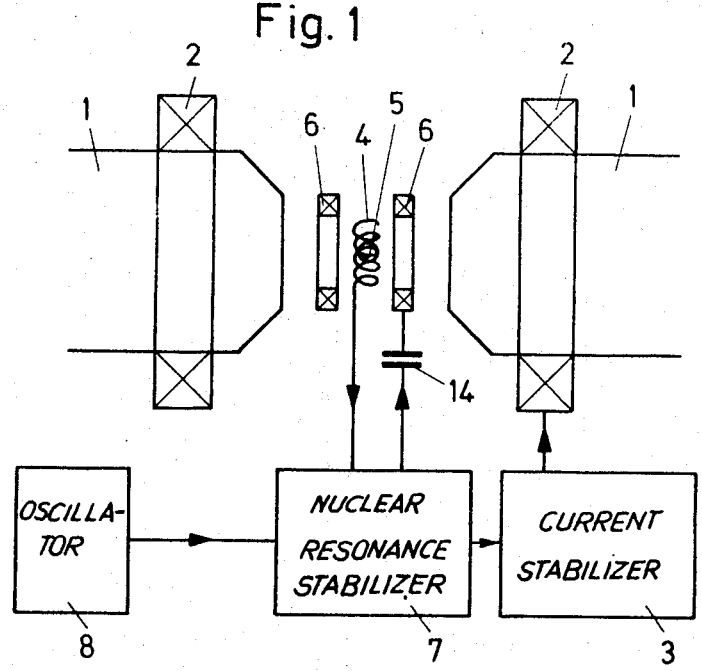
FIG. 1 is a schematic diagram, partly in block form, of one embodiment of apparatus according to the invention.

In the embodiments illustrated in FIG. 1 excitation coils 2 are disposed on the two oppositely disposed pole pieces 1 of the electromagnet of a nuclear resonance spectrometer, which excitation coils are fed by a current source 3 with a constant amplitude direct current. The two coils 2 are connected together in series, the respective connecting lines not being shown in order not to unnecessarily complicate the drawing. The d.c. current source 3 includes, for example, a rectifier whose input connected to the alternating current mains and which is provided with means to stabilize its output current at a predetermined value, i.e., to make it independent of fluctuations in the mains voltage. The stabilized direct current source, or current stabilizer, 3 effects a coarse stabilization of the magnetic field produced between the pole pieces 1 in that it keeps the field roughly constant.

Between the pole pieces 1 a receiving coil 4 is disposed in the usual manner around the sample probe 5 to be tested. This probe is indicated in the drawing simply by a circle. On both sides of the receiver coil 4 two symmetrically disposed iron-free coils 6 are provided for effecting a rapidly responding fine stabilization to the magnetic field. The coils 6 are connected in series with one another and to a nuclear resonance stabilizer 7 via a capacitor 14. The nuclear resonance stabilizer 7 receives, on the one hand, an alternating voltage produced by nuclear resonance in the receiver coil 4 and, on the other hand, an alternating voltage of a predetermined frequency which is produced by an oscillator 8.

The nuclear resonance stabilizer 7 compares, in a known manner, the frequencies, or phases of the two alternating voltages which it receives and produces a correction signal which corresponds to the difference therebetween. The lower frequency, or slowly varying, component of this signal is fed to the current stabilizer 3, whereas the higher frequency, or rapidly varying, component reaches coils 6 via capacitor 14, coils 6 being connected in series. The means for evaluating the receiver 4 output voltage usually employed with nuclear resonance spectrometers are not shown, but any known device may be used.

The other embodiments which will be described below produce an even better result because they achieve a better coarse stabilization so that the excitation current supplied to the fine stabilization coils 6 can even be weaker.

Figure 2:
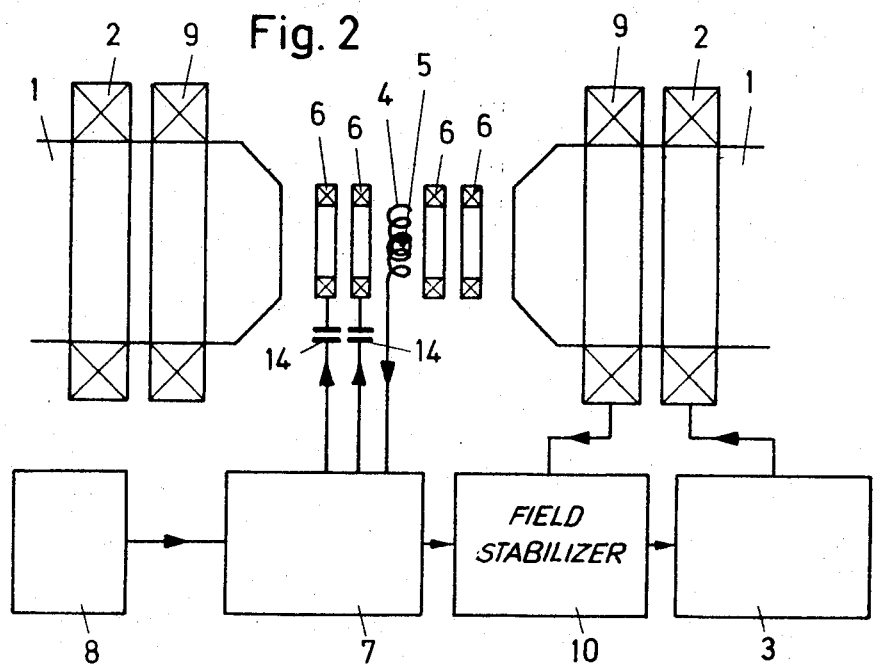

In the second embodiment shown in FIG. 2 there are provided, in addition to the elements 1–8 and 14 already described in connection with FIG. 1, two series-connected pickup coils 9 which are disposed around the pole pieces 1 and which, upon a change in the magnetic field flux, furnish a signal in a known manner to a known field flux stabilizer 10. The flux stabilizer 10 moreover receives the low frequency component of the output from nuclear resonance stabilizer 7 and itself furnishes the control signal to the stabilized direct current source 3. This control signal reduces the current furnished by the source to the excitation coils 2 when the flux has increased and vice versa.

Since it is the practice in the nuclear resonance art to refer to a stabilized direct current source as a "current stabilizer", it can be said that in the present case the coarse stabilization is effected by a current stabilizer 3 which is controlled by a flux, or field, stabilizer 10. The rapid response, fine stabilization is here also effected by the nuclear resonance stabilizer 7 which feeds coils 6. However, in the present case, two pairs of coils 6 are connected to nuclear resonance stabilizer 7 via capacitors 14, each pair being excited with a different excitation current. This assures a freedom from gradients in the region of sample probe 5.

In FIG. 3, which illustrates a third embodiment, the excitation coils 2 and the elements for effecting the coarse stabilization of the magnetic field are not shown. They may have the same configuration as shown in FIG. 1 or FIG. 2. The details of the fine stabilization are illustrated, however.

The voltage furnished by the receiver coil 4 is amplified in an amplifier 11 whose output signal is fed to a phase detector 12 which compares the phase of this signal with that of a reference voltage obtained from oscillator 8 and which produces an output signal dependent on the phase relation, which signal is fed to the two fine stabilization coils 6 via an attenuator 13 and a capacitor 14. Two transmitter coils 15, also shown in FIG. 3, are connected to the oscillator 8 to serve as a transmitter producing an alternating magnetic field. The geometric axis of these transmitter coils, which serve to produce the rotating magnetic effect and which were not shown in the embodiments of FIGS. 1 and 2 in reality does not lie in the direction of the direct magnetic field but rather perpendicular thereto. Coils 15 are shown rotated by 90° with respect to the probe simply for reasons of a simpler illustration.

In the fourth embodiment illustrated in FIG. 4 a known single-coil arrangement is employed for both exciting the alternating field and receiving the signal from the sample. The transmitter-receiver coil 15, 4 is connected with a transmitter-receiver bridge 16 having one side connected to oscillator 8 and the other side connected to phase detector 12. The attenuator 13, which is connected to the output of the phase detector 12, is connected to the fine stabilization coils via a high pass filter formed by capacitor 14 and a grounded resistor 17. Of course, the filter can also be designed in a different manner to produce special characteristics. The output of the phase detector 12 is further connected to the field stabilizer 10 via a second attenuator 18 and a low pass filter formed by a resistor 19 and a grounded capacitor 20.

The coupling of the nuclear resonance stabilizer 16, 12, 13, 14, 17 with the coarse stabilization device 10, 3, which is effected via elements 18–20, is effective only for slow fluctuations of the magnetic field while rapid fluctuations are compensated by the fine stabilization coils 6.

In the fifth embodiment shown in FIG. 5, in addition to the elements described in connection with FIG. 1, a second probe 21 is provided and is disposed in a second receiver coil 22 also placed between the pole pieces 1, but in such a manner that the field of the fine stabilization coils 6 is ineffective at the location of the second probe 21. The signal originating from the second probe 21 is fed to a second nuclear resonance stabilizer 23 whose output is connected with a second oscillator 24. The first probe 5 serves in a known manner as the internal standard and the second probe as the external standard. The coarse stabilization is effected, in this case, by the stabilizers 23 and 3 with the possible addition, if required, of a field stabilizer, such as the device 10 of FIG. 2.

Figure 5:
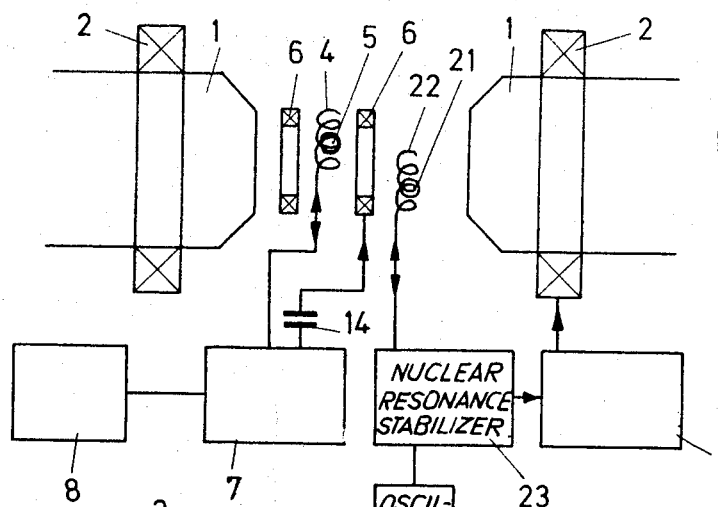
Figure 6:
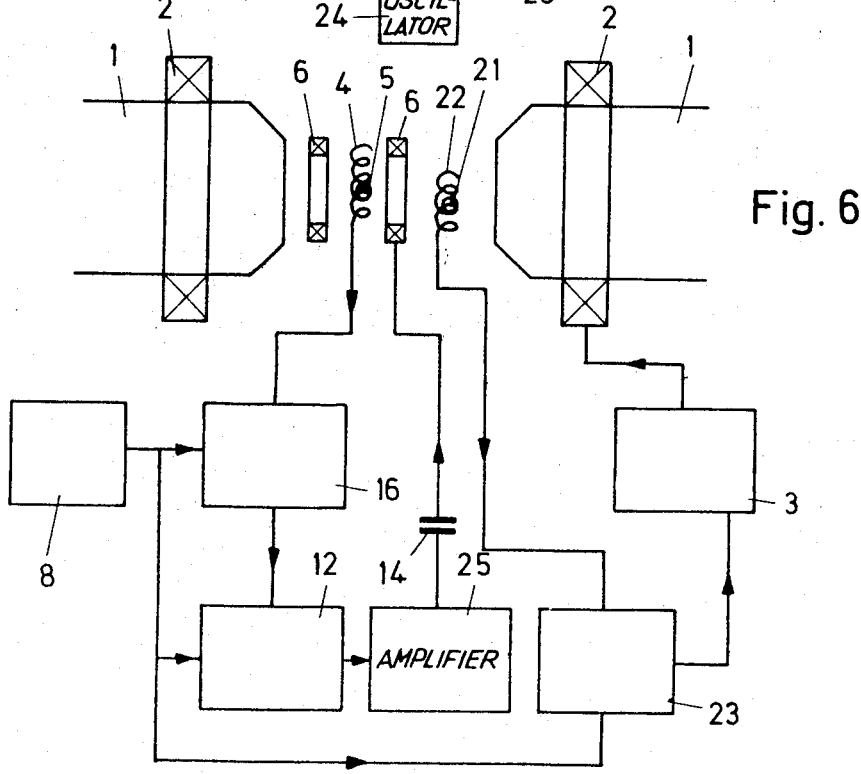

In the sixth embodiment shown in FIG. 6 an internal standard 5 and an external standard 21 are provided. This embodiment differs from that of FIG. 5 in that a single oscillator 8 controls the two nuclear resonance stabilizers. Moreover, FIG. 6 shows a preferred configuration of the first nuclear resonance stabilizer which serves for the fine stabilization. This stabilizer consists of the transmitter-receiver bridge 16, the phase detector 12 and an amplifier 25 disposed between the phase detector 12 and the fine stabilization coils 6.

The devices of FIGS. 5 and 6 are particularly advantageous because the field is kept constant, except for rapid fluctuations, by the second probe 21 when the first probe 5 is replaced. However, the same result can also be obtained with the embodiment of FIG. 7.

In the embodiment shown in FIG. 7, the field of the fine stabilization coils 6 acts on the first probe 5 as well as on the second probe 21. The probe 21 acts on the excitation coils 2 via a coarse stabilizer 26, this coarse stabilizer 26 containing a nuclear resonance stabilizer such as device 23, an oscillator such as 24 and a current stabilizer such as 3, and possibly also a field stabilizer such as 10 for which then of course pickup coils such as 9 must also be provided. It is of advantage for the superposition of the stabilization effects if a probe is selected for the external standard which has a wider nuclear resonance line, i.e., a greater half-field strength, than the probe serving as the internal standard.

In the eighth embodiment shown in FIG. 8, the coarse stabilization means are omitted for reasons of simplicity. They may be designed in the same manner as in any of the preceding embodiments. According to FIG. 8, two pairs of fine stabilization coils 6 are provided and are fed by the nuclear resonance stabilizer 7 via an attenuator 13 and a capacitor 14 each. In addition, one pair of coils 6 is fed with direct current by a device 27 in order to effect a correction of field gradients of the fourth order. The other pair of coils 6 is additionally supplied with alternating current by a device 28 in order to produce a field modulation. In this way, special correction or modulation coils are made unnecessary.

The units shown in block form in the figures could all be constituted by known, commercially available devices. As already noted, devices of the type disclosed in the above-cited Swiss patents could be employed. Also, the various stabilizers could have the form disclosed in U.S. Pat. No. 3,435,333 issued to Lienhard Wegmann and Mario Gallo on Mar. 25, 1969.

Examples for gradient correction devices 27 and field modulation devices 28 are described in U.S. Pat. Nos. 3,105,176 and 2,979,641 both issued to H.H. Gunthard and J.J. Primas. The T/R Bridge 16 is well known in the literature as a "Purcell-Bridge". U.S. Pat. No. 2,979,641 corresponds to the above cited Swiss Pat. No. 348,561. The other above cited Swiss Pat. No. 376,291 corresponds to U.S. Pat. No. 3,124,741.

It will be understood that the above description of the present invention is susceptible to various modifications, changes and adaptations and the same are intended to be comprehended within the meaning and range of equivalents of the appended claims.

I claim:

1. In apparatus for stabilizing the magnetic field of a magnetic nuclear resonance spectrometer having a sample analysis channel and a magnetic field stabilization channel and including a magnet having pole pieces which produce this field, a pair of excitation coils disposed around the pole pieces of the magnet, a magnetic field stabilizer connected to feed the coils and serving as coarse stabilization control means, and a receiver coil which is arranged to surround a sample probe and which is disposed within the magnetic field, the receiver coil receiving the resonance signal produced by the sample probe and producing an alternating voltage constituting a representation of the signal which it receives, and the receiver coil forming part of both the analysis channel and the stabilization channel of the spectrometer, the improvement comprising: a pair of broadband coils having iron-free cores and disposed between said pole pieces; a nuclear resonance stabilizer connected to receive the alternating voltage produced by the receiver coil and constituting means for producing at the output of said nuclear resonance stabilizer a correction signal corresponding to deviations in the instantaneous frequency of such voltage from a predetermined value; and a high pass filter connected between said broadband coils and the output of said nuclear resonance stabilizer for supplying only higher frequency component of the correction signal at the output of said stabilizer to said coils to produce a rapid fine stabilization of the magnetic field in the vicinity of the sample probe.

2. An arrangement as defined in claim 1 wherein said coarse stabilization control means comprise a current stabilizer for maintaining the value of the current to the coils substantially constant.

3. An arrangement as defined in claim 1 wherein said coarse stabilization control means comprise a field flux stabilizer for maintaining the value of the flux of the magnetic field of the spectrometer substantially constant.

4. An arrangement as defined in claim 1 wherein said nuclear resonance stabilizer comprises: an oscillator producing an alternating voltage at a predetermined frequency; a phase detector connected to receive the alternating voltage produced by said oscillator and the alternating voltage produced by the receiver coil for comparing the phases of these two voltages and producing at its output a signal dependent on the relation between these phases; and an attenuator connected to the output of said detector; the output of said attenuator being connected to said filter.

5. An arrangement as defined in claim 1 wherein said filter includes a capacitor connected between said nuclear resonance stabilizer and said broadband coils.

6. An arrangement as defined in claim 1 further comprising a low pass filter connected between the output of said nuclear resonance stabilizer and an input of said coarse stabilization control means.

7. An arrangement as defined in claim 1 wherein said coarse stabilization control means comprise a second nuclear resonance stabilizer.

8. An arrangement as defined in claim 7 wherein further comprising: a second sample probe disposed between said pole pieces at a location which is not influenced by said broadband coils, said second probe serving as an external standard; and a second receiver coil enclosing said second probe and connected to said second nuclear resonance stabilizer.

9. An arrangement as defined in claim 7 further comprising a stable oscillator connected to feed both of said nuclear resonance stabilizers.

10. An arrangement as defined in claim 7 further comprising a second sample probe disposed in the effective field of said broadband coils and a second receiver coil surrounding said second probe and connected to apply the resonant signal produced by said second probe to said second nuclear resonance stabilizer.

11. An arrangement as defined in claim 10 wherein said two probes produce nuclear resonance lines of respectively different half-field widths.

12. An arrangement as defined in claim 1 wherein said nuclear resonance stabilizer comprises an amplifier whose output is connected to said filter.

13. An arrangement as defined in claim 1 further comprising a current source connected to feed an additional current to said broadband coils.

14. An arrangement as defined in claim 1 wherein only one pair of broadband coils are provided and have dimensions which are large compared to the sample probe diameter.

15. An arrangement as defined in claim 1 wherein there are at least two pairs of said broadband coils, which together produce a substantially gradient-free magnetic field.

* * * * *